(12) United States Patent
Schiff

(10) Patent No.: US 7,596,354 B2
(45) Date of Patent: Sep. 29, 2009

(54) OPTIMIZING POLARIZATION OF FORWARD LINK

(75) Inventor: Leonard Norman Schiff, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 741 days.

(21) Appl. No.: 11/301,834

(22) Filed: Dec. 12, 2005

(65) Prior Publication Data

US 2007/0135050 A1 Jun. 14, 2007

(51) Int. Cl.
*H04B 1/00* (2006.01)

(52) U.S. Cl. .............. 455/63.4; 455/12.1; 455/562.1; 343/702; 342/361; 342/362; 342/363; 342/188

(58) Field of Classification Search .......... 455/12.1, 455/562; 343/702; 342/361, 362, 363, 188
See application file for complete search history.

(56) References Cited

U.S. PATENT DOCUMENTS

| | | | | |
|---|---|---|---|---|
| 5,691,727 | A | * | 11/1997 | Cyzs ................... 342/361 |
| 5,878,346 | A | * | 3/1999 | Ray et al. ............. 455/431 |
| 7,043,198 | B2 | * | 5/2006 | Hanson et al. ........ 455/13.1 |
| 2002/0198026 | A1 | * | 12/2002 | Niemela .............. 455/562 |
| 2003/0008614 | A1 | * | 1/2003 | Hanson et al. ........ 455/12.1 |

FOREIGN PATENT DOCUMENTS

WO 0154230 A 7/2001

OTHER PUBLICATIONS

Office Action for EP Patent Application 06 850 276.4-2411 dated Feb. 2, 2009, 3 pages.
International Search Report dated Dec. 17, 2007, serial No. PCT/US2006/061950, 3 pages.

* cited by examiner

*Primary Examiner*—Matthew D Anderson
*Assistant Examiner*—April S Guzman
(74) *Attorney, Agent, or Firm*—Turocy & Watson, LLP (57) ABSTRACT

A mechanism that enables a gateway to dynamically determine which of two transmission signal polarizations is best received by a wireless communication device having a nominally linear antenna. A first pilot and second pilot signals, having different polarizations and orthogonally encoded, are transmitted to the communication device. The communication device determines the relative or absolute signal strengths of the first and second pilot signals and transmits this information to the gateway. The gateway then selects the polarization having the strongest associated signal strength to transmit content-bearing signals to the communication device. Alternatively, the communication device may also determine the phase difference between the first and second pilot signals and transmit this information to the gateway. The gateway can then transmit content-bearing signals using a proportional amount of signal power on each the first and second polarizations and use the proper phasing to approximate the polarization orientation of the communication device.

46 Claims, 5 Drawing Sheets

OPTIMIZING POLARIZATION OF FORWARD LINK

BACKGROUND

1. Field

The present invention generally relates to wireless communication systems, and more specifically to forward-link signal transmissions from a gateway to a wireless communication device having a single-polarization antenna.

2. Background

The rapid development of wireless communication systems has enabled people to stay connected while they move about or travel. Typically, land-based base stations are deployed to wirelessly couple a wireless communication device (e.g., wireless telephone) to other communication devices (e.g., other wireless telephones). However, it is often not economical or feasible to deploy base stations in rural or sparsely populated areas. In such situations, satellite-based wireless communication devices (e.g., satellite telephones) are able to provide a communication link without the need for land-based base stations. One or more geosynchronous or geostationary satellites orbiting the earth may be deployed to communicate with one or more wireless communication devices (e.g., satellite telephones).

Gateways and relaying satellites often employ polarized antennas, such as right hand circular (RHC) and left hand circular (LHC) polarized or vertical and horizontal polarized, to communicate with wireless communication devices.

The polarization of a wireless communication device is often random or unpredictable depending on how it is held by the user. That is, the polarization orientation of the communication device antenna varies depending on the device orientation and proximity to the user's head and hands, etc. Therefore, depending on the operating conditions, the LHC or RHC response of the nominally linear antenna may be stronger than the other. This may lead to degradation of the received signal and communication quality. Thus, matching the transmitted polarization to the orientation of the receiving antenna can improve the forward link transmission.

SUMMARY

One feature provides a mechanism to enable a satellite-based gateway to dynamically determine which of two transmission signal polarizations is best received by a wireless communication device having a single, nominally linear antenna. A first pilot and second pilot signals having different polarizations and orthogonally encoded are transmitted to the communication device. The communication device determines the absolute or relative signal strengths of the first and second pilot signals and transmits this signal strength information to the gateway. The gateway then selects the polarization having the strongest associated signal strength to transmit content-bearing signals to the communication device. Alternatively, the communication device may also determine the phase difference between the first and second pilot signals and transmit this information to the gateway. The gateway can then transmit information or content-bearing signals using a proportional amount of signal power on each the first and second polarizations and use the proper phasing to approximate the polarization orientation of the communication device.

One embodiment of the invention provides a communication device including (a) an antenna, (b) a transceiver coupled to the antenna, the transceiver to manage signal transmissions to and from the antenna, and (c) a processing unit communicatively coupled to the transceiver and configured to (1) receive a first signal having a first polarization, (2) receive a second signal having a second polarization different from the first polarization, and (3) determine the signal strengths of the first and second signals, (4) determine a phase angle between the first and second signals, (5) transmit the signal strength information of the first and second signals to a gateway, and/or (6) transmit the phase angle to the gateway. The polarization of the communication device antenna may vary depending on the orientation of the communication device and operating conditions. The first polarization may be right hand circular polarization and the second polarization may be left hand circular polarization. In other embodiments, the first polarization may be vertical polarization and the second polarization may be horizontal polarization. The first and second signals may be a pilot signal having different polarizations and coding functions, such as Walsh functions. In another embodiment, the first and second signals are transmitted on alternate timeslots of a time-divided channel to achieve orthogonality between the first and second signals.

The first signal may be encoded with a first coding function and the second signal may be encoded with a second coding function, with the first and second coding functions being orthogonal functions. In one implementation, the communication device may be a mobile telephone that communicates with the gateway through a relaying satellite. In some implementations, the gateway may be a terrestrial base station that communicates either directly or indirectly with the communication device.

Another embodiment of the invention provides a gateway including (a) an antenna to communicate with one or more communication devices, and (b) a processing unit communicatively coupled to the antenna. The processing unit transmits through the antenna and is configured to (1) transmit a first signal having a first polarization, (2) transmit a second signal having a second polarization different from the first polarization, (3) receive information indicating the relative or absolute signal strengths of the first and second signals as received by a first communication device, (4) receive information indicating the signal phase of the first and second signals as received by the first communication device, (5) select the polarization having the strongest associated signal strength to transmit content-bearing signals, and/or (6) transmit content-bearing signals using a proportional amount of signal power on each the first and second polarizations and use the proper phasing to approximately match the polarization orientation of the first communication device. The gateway may generate the first signal by encoding a pilot signal with a first coding function and generate the second signal by encoding the pilot signal with a second coding function, where the first and second coding functions being orthogonal functions such as Walsh functions. In another embodiment, the first and second signals are transmitted on alternate timeslots of a time-divided channel to achieve orthogonality between the first and second signals. The first polarization may be right hand circular polarization and the second polarization may be left hand circular polarization. In other embodiments, the first polarization may be vertical polarization and the second polarization may be horizontal polarization. The first and second signals are a pilot signal having different polarizations and coding functions.

In some implementations, the gateway may communicate directly with the one or more communication devices or indirectly through a relaying satellite. In some embodiments, the gateway may be a terrestrial base station.

Another feature provides a method operational on a communication device, comprising (a) receiving a first pilot signal having a first polarization, (b) receiving a second pilot signal having a second polarization different from the first polarization, (c) determining the signal strengths of the first and second signals, (d) determining the phase difference between the first and second signals, (e) transmitting the relative or absolute signal strengths to a gateway, and/or (f) transmitting the phase difference to the gateway.

Another feature provides a method operational on a gateway, comprising (a) transmitting a first pilot signal having a first polarization and encoded with a first coding function, (b) transmitting a second pilot signal having a second polarization different from the first polarization and encoded with a second coding function, the first and second coding functions being orthogonal functions, (c) receiving information indicating the relative or absolute signal strengths of the first and second pilot signals as received by a first communication device, (d) selecting the polarization having the strongest associated signal strength to transmit content-bearing signals to the first communication device, and/or (e) transmitting content-bearing signals using a proportional amount of signal power on each the first and second polarizations and use the proper phasing to approximate the polarization orientation of the first communication device. The gateway may also encode a pilot signal with a first coding function to generate the first signal and encode the pilot signal with a second coding function, the first and second coding functions being orthogonal functions.

Another aspect of the invention provides a machine-readable medium having one or more instructions for a communication device to notify a gateway of its polarization, which when executed by a processor causes the processor to: (a) receive a first pilot signal having a first polarization and encoded with a first coding function, (b) receive a second pilot signal having a second polarization different from the first polarization and encoded with a second coding function, the first and second coding functions being orthogonal functions, (c) determine a phase angle between the first and second signals, (d) transmit relative or absolute signal strength information of the first and second pilot signals to the gateway, and (e) transmit the phase angle between the first and second pilot signals to the gateway.

Another feature of the invention provides a machine-readable medium having one or more instructions for a gateway to determine a polarization of a first communication device, which when executed by a processor causes the processor to: (a) transmit a first pilot signal having a first polarization and encoded with a first coding function, (b) transmit a second pilot signal having a second polarization different from the first polarization and encoded with a second coding function, the first and second coding functions being orthogonal functions, (c) receive information indicating the relative or absolute signal strengths of the first and second pilot signals as received by a first communication device, (d) receive information indicating the signal phase of the first and second pilot signals as received by the first communication device, (e) select the polarization having the strongest associated pilot signal strength to transmit content-bearing signals to the first communication device, and/or (f) transmit content-bearing signals using a proportional amount of signal power on each the first and second polarizations and use the proper phasing to match the polarization orientation of the first communication device.

DETAILED DESCRIPTION

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage device, wireless channels and various other mediums capable of storing or containing instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted through any suitable means including memory sharing, message passing, token passing, network transmission, etc.

A method and apparatus are provided to enable a gateway to dynamically determine which of two transmission signal polarizations is best received by a communication device having a single antenna of arbitrary polarization. Because the gateway can transmit on two orthogonal polarizations, it can optimize transmissions of information-bearing signals to the communication device by (a) transmitting on the best received polarization or (b) transmitting a proportional amount of signal power on each the two orthogonal polarizations and use proper phasing to match the polarization orientation of the communication device. This concept can be employed on ground-based and satellite-based communication systems regardless of the polarization of the receiving communication device.

Figure 1:
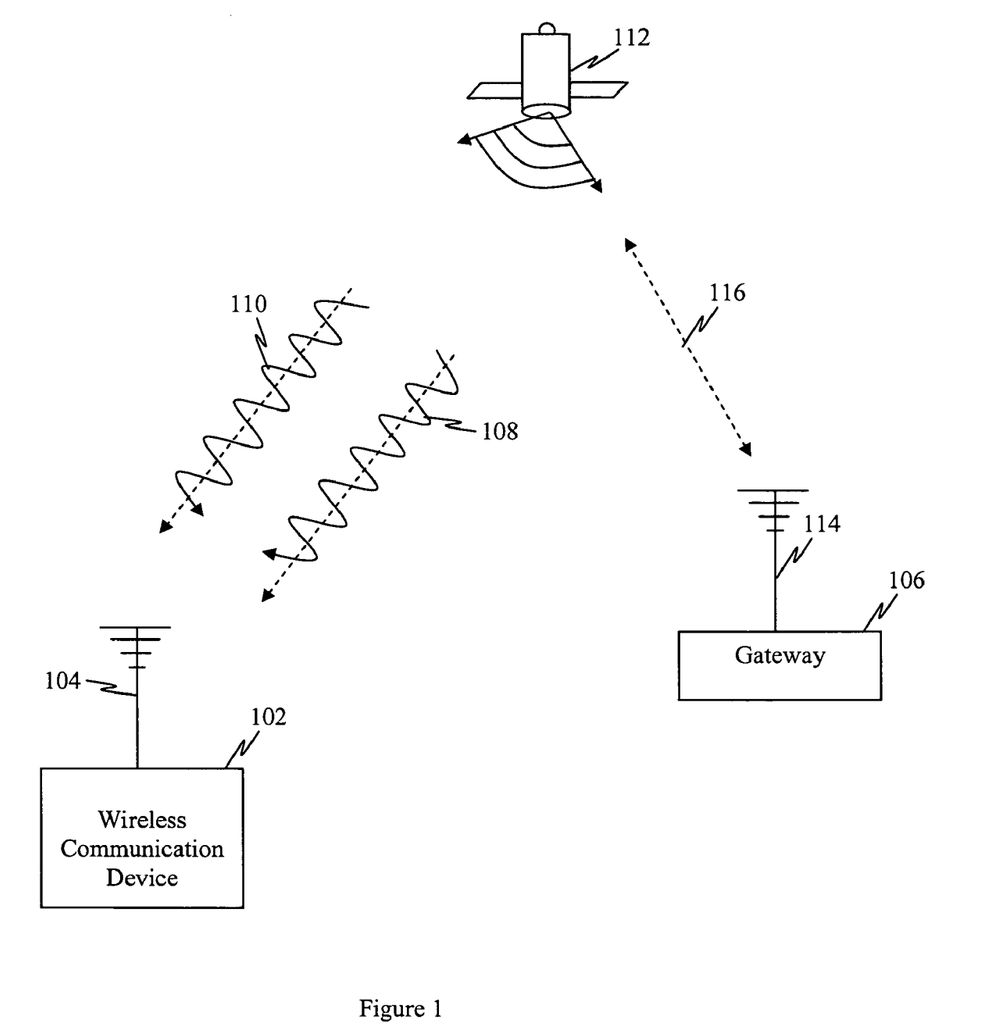
FIG. 1 illustrates a wireless communication system implementing a forward link polarization optimization scheme

FIG. 1 illustrates a wireless communication system implementing a forward link polarization optimization scheme. A wireless communication device 102, such as a wireless telephone, mobile telephone, handheld communication device, etc., may include a nominally linear polarized antenna 104 to communicate with a gateway 106 via a relaying "bent-pipe" satellite 112. In some implementations, gateway 106 may be a base station communicating, directly or indirectly, with communication device 102. That is, the base station may transmit directly to communication device 102 (e.g., without an intermediate relaying satellite or other device) or indirectly via a relaying satellite or other device.

When employing relaying satellite 112 (or other relaying device), a feeder link 116 is employed from gateway 106 to satellite 112 and a service link from the satellite 112 to communication device 102.

In one implementation, orthogonally polarized signals are transmitted from gateway 106 to satellite 112 and then relayed to communication device 102. Gateway 106 may include a circular polarized antenna 114 that can transmit or radiate both RHC and LHC polarizations. In an alternative embodiment, the gateway 106 may include one or more linear polarized antennas that can transmit both vertical and horizontal polarizations. Satellite 112 radiates in two polarizations (e.g., either RHC and LHC or vertical and horizontal polarization) by repeating the two polarizations sent from the gateway 106. Thus, the satellite acts as a relay for polarized signals from the gateway to communication device 102.

In other implementations, gateway 106 may transmit two signals having the same polarization but orthogonal by virtue of being on different frequencies. Satellite 112 then translates the different frequencies to the same frequency, orthogonally codes the signals, and transmits them to communication device 102.

In yet other implementations, gateway 106 may transmit two signals that are linearly polarized and orthogonal and satellite 112 converts them to circularly polarized, or vice-versa.

For simplicity, the following description focuses on examples having a circular polarized antenna. However, the present invention can be performed with other types of antenna on gateway 106 and satellite 112 (e.g., a circular/spiral antenna or linear polarized antennas).

Gateway 106 enables wireless communication device 102 to communicate with other communication devices by acting as a bridge between wireless communication device 102 and other wired and/or wireless networks and/or devices. In various implementations, gateway 106 may be located at a fixed ground location or it may be mounted on a satellite 112 (e.g., a geosynchronous or geostationary satellite, etc.) or on an aircraft.

Gateway 106 may broadcast periodic or continuous polarized pilot signals that are relayed by the satellite 112 to wireless communication devices within range of the satellite 112. The two pilot signals are doubly orthogonal, first by polarization and second by Walsh code. Because the receiving antenna 104 picks up both polarizations, the polarization orthogonality doesn't identify the two signals but the code (e.g., Walsh code) orthogonality does. As noted above, the task of making the pilot signals (or any other information-bearing signal) orthogonal to each other may occur either at gateway 106 or satellite 112.

In one implementation, the gateway 106 may include a first antenna having a first polarization (e.g., RHC) and a second antenna having a second polarization (e.g., LHC), with the signals transmitted from each antenna having a different Walsch code. In one example, two polarized pilot signals are radiated or transmitted by gateway 106. The two pilot signals are orthogonal to each other and are radiated on different polarizations (e.g., either RHC/LHC or vertical/horizontal) to minimize interference and improve their reception. That is, a first pilot signal 108 is RHC polarized while a second pilot signal 110 is LHC polarized. The pilot signals may be made orthogonal by processing the pilot signal through two orthogonal functions (e.g., two different Walsh functions or codes). The two pilot signals 108 and 110 may be radiated on each frequency division multiplexed (FDM) channel from gateway 106 and are relayed to the communication device 102 by satellite 112.

At the receiving side, wireless communication device 102 searches for pilot signals 108 and 110 on both orthogonal functions (e.g., Walsh codes). The communication device 102 receives both signal polarizations on nominally linear antenna 104. That is, nominally linear antenna 104 may receive portions of each polarized signals 108 and 110 depending on the orientation of the antenna 104.

Upon receiving pilot signals 108 and 110, wireless communication device 102 determines their signal strength and reports the signal strengths of both pilot signals 108 and 110 to gateway 106 periodically or continuously. Such signal strength reporting may be done periodically or irregularly (e.g., as when there is a significant change in the signal strength). In some implementations, the frequency of reporting the received signal strengths to the gateway 106 is significantly longer than the frequency of the pilot signals.

Communication device 102 may report on the pilot signal strengths in a number of ways, including (1) sending a single bit indicating which of the two polarizations is strongest, (2) sending only the relative strengths between the two polarizations, and/or (3) sending the actual signal strengths for both polarizations. In the case where gateway 106 transmits information-bearing signals only on the strongest of the two polarizations, an indicator (e.g., bit) of which of the two pilot signals is strongest would suffice. On the other hand, where the gateway 106 proportionally controls transmissions of information-bearing signals on both polarizations, information on the relative or absolute strengths of the two polarizations is sent by the communication device 102. Typically, the signal polarization which most closely aligns with the orientation of antenna 104 will have the greatest signal strength.

The pilot signals may be identified by gateway 106 using their orthogonal encoding function (e.g., Walsh codes). Since gateway 106 knows which polarization corresponds to which encoding function, it can ascertain which pilot signal polarization has the greater signal strength when it receives feedback from the communication device 102 (e.g., the communication device 102 identifies the relative or absolute signal strengths based on the Walsh code of each polarization).

From these pilot strength reports, gateway 106 knows which polarization is being received most strongly by communication device 102. From that point forward, gateway 106 can transmit other information-bearing signals to wireless communication device 102 on the polarization (e.g., RHC or LHC) that is being received most strongly.

According to some embodiments, wireless communication device 102 reports not only the signal strength of the two pilot signals 108 and 110 but also the phase angle between the two signals 108 and 110. This can be done by merely comparing the phases of the two pilot signals 108 and 110.

With this report of the signal strength and phase of the two pilot signals 108 and 110, gateway 106 knows the polarization orientation of receiving wireless communication device 102. Gateway 106 can then transmit information-bearing signals to the communication device in two ways. In the first way, the gateway 106 transmits only on the polarization which is most strongly received by the communication device 102. In the second way, the gateway 106 transmits a proportional amount of power on each polarization and uses the proper phasing between the two polarized information-bearing signals so that the wireless communication device 102 receives the information-bearing signals on its polarization orientation. For instance, gateway 106 may transmit an information-bearing signal as RHC polarized at a first power level and phase while transmitting the information-bearing as LHC polarized at a second power level and phase. The combination of the RHC polarized and LHC polarized information-bearing signals at the receiving wireless communication device 102 results in better reception of a proportionally polarized information-bearing signal. Note that once a desired signal polarization, proportional power and/or phase components are determined, information-bearing signals to the wireless communication device 102 can be transmitted using such polarization, power and/or phase components.

Figure 2:
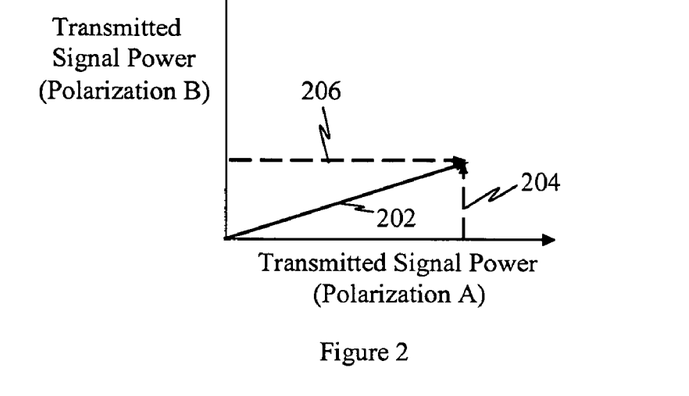
FIG. 2 illustrates how a signal can be proportionally polarized to match the polarization of a receiving communication device by radiating proportionally polarized signals to form the desired polarization.

FIG. 2 illustrates how an information-bearing signal 202 can be proportionally polarized vertically and horizontally to match the polarization of a receiving communication device 102 by radiating proportionally polarized signals 204 and 206, respectively, to form the desired polarization. That is, gateway 106 transmits on each polarization at the determined signal powers 204 and 206 which result in the desired signal polarization 202. Gateway 106 can also adjust the amplitude between the two polarizations to adjust phase angles between the signals 204 and 206 so that the resulting signal 202 aligns with the orientation of antenna 104. Similarly, an information-bearing signal can also be proportionally polarized RHC and LHC.

In this manner, the system is not limited to just two polarizations (e.g., LHC and RHC or vertical and horizontal polarizations) but any polarization and/or phase in between. This means that all or most of the power transmitted by gateway 106 is coupled to wireless communication device 102 with minimal power loss. This is a substantial improvement over the present communication systems and provides substantial gain. Of course, with a finite number of bits sent by wireless communication device 102 to report to gateway 106 the relative pilot strengths and phase angle, the result may not be perfect. However, with enough bits it can come as close as needed.

Figure 3:
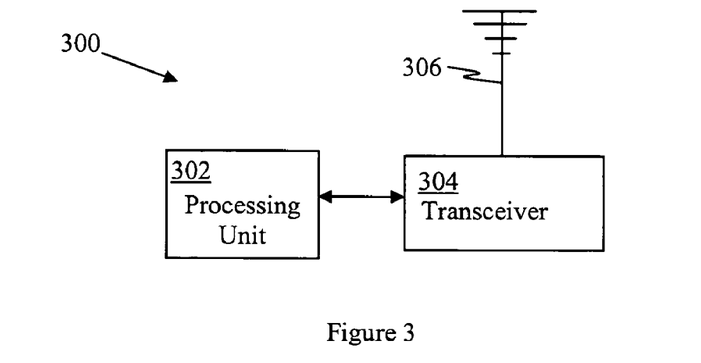
FIG. 3 is a block diagram illustrating of a wireless communication device according to some implementations.

FIG. 3 is a block diagram illustrating of a wireless communication device 300 according to some implementations. As previously noted, wireless communication device 300 may be a mobile telephone, handheld device, computer, etc., that can communicate with other devices via a satellite link. Wireless communication device 300 includes a processing unit 302 communicatively coupled to a transceiver 304 having a nominally linear polarized antenna 306. Antenna 306 may be either a vertical or a horizontal polarized antenna and its polarization may vary depending on the orientation of communication device 300 and operating conditions.

Processing unit 302 is configured to receive and transmit via transceiver 304. Transceiver 304 manages signal transmissions to and from the antenna 306. Processing unit 302 is communicatively coupled to transceiver 304 and configured to (a) receive a first signal having a first polarization, (b) receive a second signal having a second polarization different from the first polarization, (c) determine the relative or absolute signal strengths of the first and second signals, (d) determine a phase angle between the first and second signals, and (e) transmit the strength information and/or phase angle information of the first and second signals to a gateway. In some embodiments, the first polarization may be RHC polarization and the second polarization may be LHC polarization. In other embodiments, the first polarization may be vertical polarization and the second polarization may be horizontal polarization. The first and second signals may be a pilot signal having different polarizations and coding functions. For instance, the first signal may be encoded with a first coding function and the second signal may be encoded with a second coding function, where the first and second coding functions are orthogonal functions such as Walsh functions.

Figure 4:
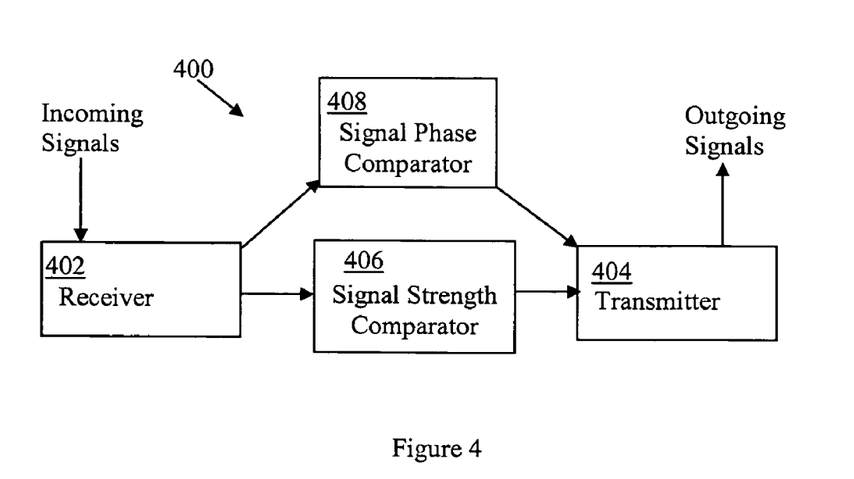
FIG. 4 illustrates components and functions of a wireless communication device according to some embodiments.

FIG. 4 illustrates components and functions of a wireless communication device 400 according to some embodiments. Wireless communication device 400 may include (a) a receiver 402 for receiving a first signal having a first polarization, (b) the receiver 402 for receiving a second signal having a second polarization different from the first polarization, and (c) a transmitter 404 for transmitting signal strength and/or phase information of the first and second signals to a gateway. The wireless communication device may also include (d) a signal strength comparator 406 for determining the relative or absolute signal strengths of the first and second signals, and (e) a signal phase comparator 408 for determining a phase angle between the first and second signals.

Note that one or more of the wireless communication device components and functions illustrated in FIGS. 3 and 4 may be combined into a single component (such as a processing unit) or embodied in several components without departing from the invention.

Figure 5:
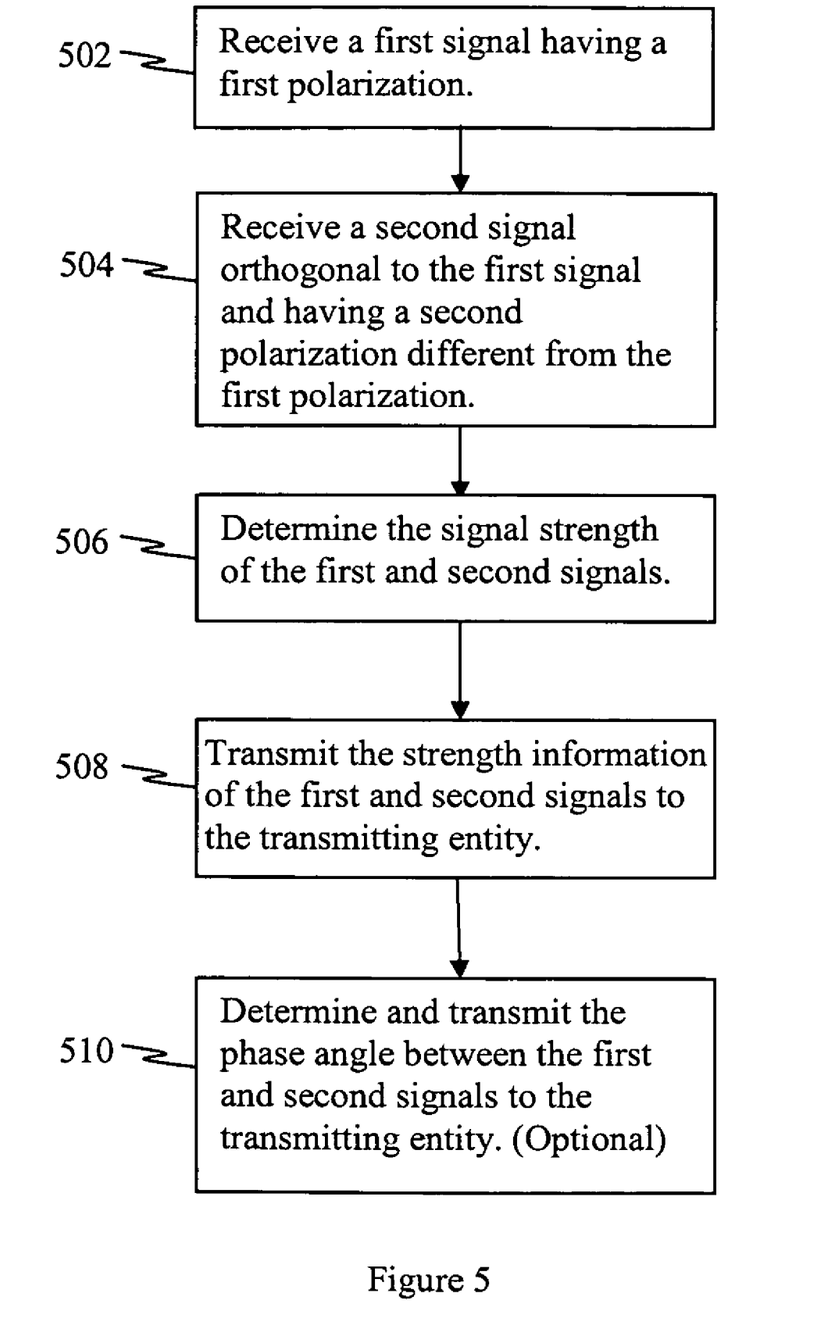
FIG. 5 illustrates a method for a receiving wireless communication device to provide polarization information to a transmitting gateway.

FIG. 5 illustrates a method for a receiving wireless communication device to provide polarization information to a transmitting gateway. The wireless communication device receives a first signal having a first polarization 502. This may be a pilot signal that has been processed using a first Walsh code and having RHC (or vertical) polarization. The wireless communication device also receives a second signal orthogonal to the first signal and having a second polarization different from the first polarization 504. This second signal may be the same pilot signal that has been processed using a second Walsh code and having LHC (or horizontal) polarization. The relative or absolute signal strengths of the first and second signals are then determined 506. The signal strength information of the first and second signals are then transmitted to the transmitting entity (e.g., gateway) 508. Additionally, in another embodiment, the wireless communication device may also determine and transmit the phase angle between the first and second signals to the transmitting entity 510. As its orientation changes, periodically, or as the received first and second (pilot) signal strengths change, the wireless communication device provides updated signal strength and/or phase information to the transmitting entity. The transmitting entity (e.g., gateway) can then transmit information bearing signals to the communication device on either (a) the strongest received polarization or (b) proportionally polarized signals that approximately match the polarization of the communication device antenna.

Figure 6:
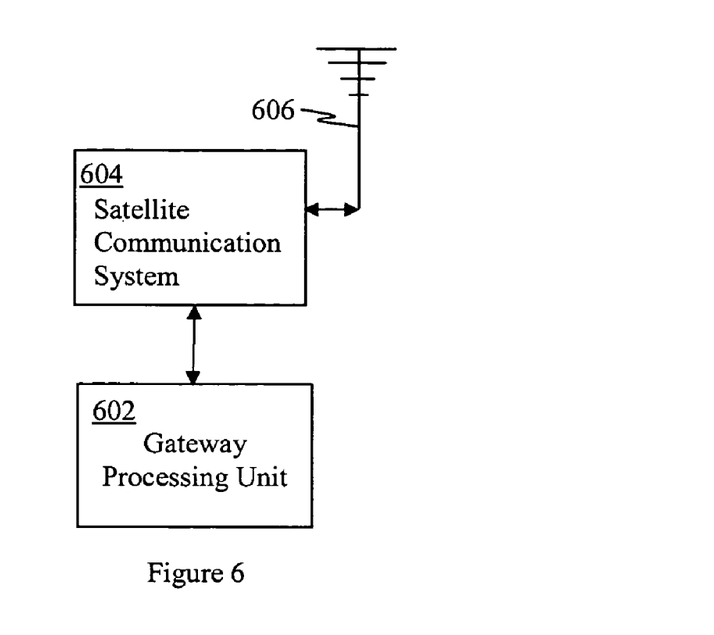
FIG. 6 is a block diagram illustrating of a gateway according to some implementations.

FIG. 6 is a block diagram illustrating of a gateway processing unit 602 and satellite 604 according to some implementations. Gateway processing unit 602 uses the satellite 604 as a communication relay or bridge for communications from gateway 602 to one or more communication devices. An antenna 606 may be a circular or spiral polarization antenna. As previously noted, satellite 604 may be a geosynchronous or geostationary satellite or airborne communication device that relays signals between gateway processing unit 602 and other wireless communication devices.

Gateway processing unit 602 may be configured to (a) receive and/or transmit via a relaying satellite communication system 604 through antenna 606, (b) transmit a first signal having a first polarization, (c) transmit a second signal having a second polarization different from the first polarization, (d) receive a signal or information indicating the relative or absolute signal strengths of the first and second signals as received by a first communication device, and/or (e) select the polarization having the strongest associated signal strength to transmit information-bearing signals. Gateway processing unit 602 may be further configured to (f) generate the first signal by encoding a pilot signals with a first coding function, (g) generate the second signal by encoding the pilot signal with a second coding function, where the first and second coding functions are orthogonal functions, (h) receive information indicating the relative signal phase of the first and second signals as received by the first communication device, and/or (i) transmit a proportional amount of signal power on each the first and second polarizations and use the proper phasing to match the polarization orientation of the first communication device. Alternatively, processing unit 602 may simply transmit on which ever of the two polarizations is most strongly received by the first communication device.

In some implementations, satellite communication system 604 may have one or more polarized antennas. The first polarization may be a right hand circular polarization and the second polarization may be a left hand circular polarization. Alternatively, the first polarization may be a vertical polarization and the second polarization may be a horizontal polarization. The first and second signals may be a pilot signal having different polarizations and coding functions, such as Walsh functions.

Figure 7:
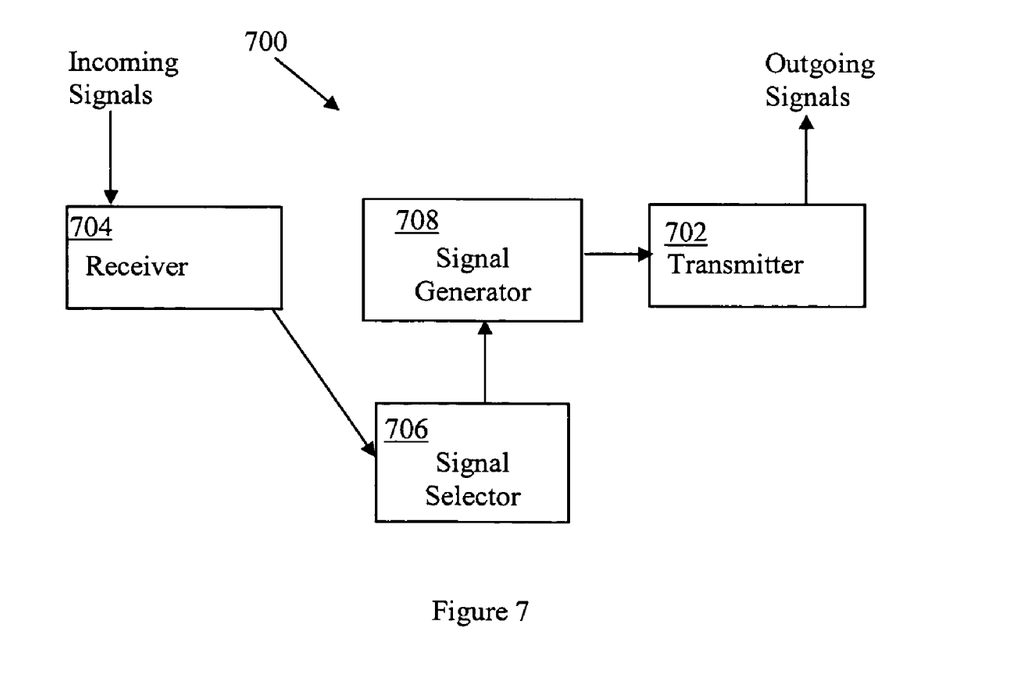
FIG. 7 illustrates components and functions of a gateway device according to some embodiments.

FIG. 7 illustrates components and functions of a gateway device 700 according to some embodiments. Gateway 700 may comprise (a) a transmitter 702 for transmitting a first signal having a first polarization, (b) the transmitter 702 for transmitting a second signal having a second polarization different from the first polarization, and (c) a receiver 704 for receiving a signal indicating the relative or absolute signal strengths of the first and second signals as received by a first communication device. Gateway 700 may further comprise (d) a signal generator 708 for generating the first signal by encoding a pilot signals with a first coding function, and (e) the signal generator 708 for generating the second signal by encoding the pilot signal with a second coding function, the first and second coding functions being orthogonal functions. In one implementation, a signal selector 706 selects the polarization having the strongest received signal strength to transmit content or information-bearing signals. Alternatively, the signal generator 708 may generate a proportional amount of signal power on each the first and second polarizations and use the proper phasing to match the polarization orientation of the first communication device to transmit a signal that more closely matches the polarization of the first communication device.

Note that one or more of the gateway components and functions illustrated in FIGS. 6 and 7 may be combined into a single component (such as a processing unit) or embodied in several components without departing from the invention.

Figure 8:
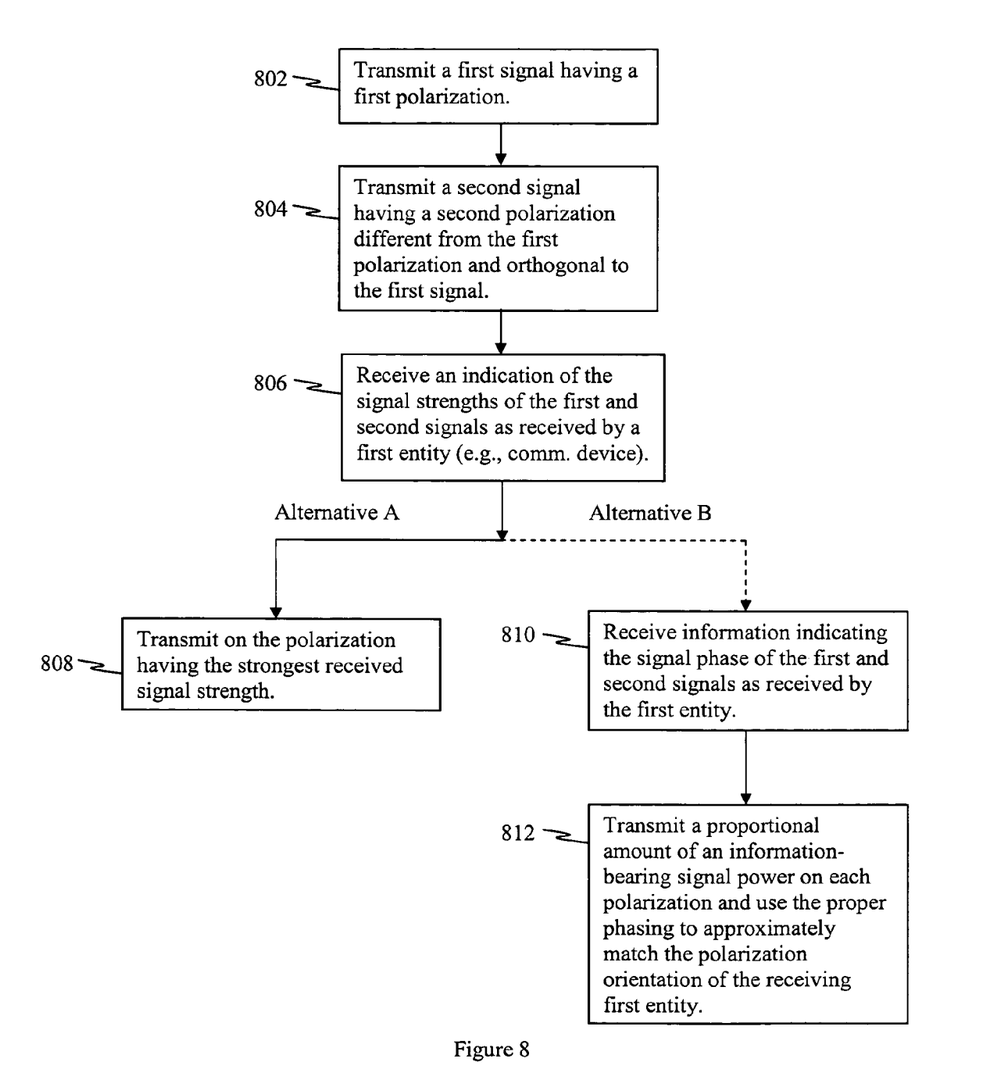
FIG. 8 illustrates a method for a transmitting gateway to tailor its transmitted information-bearing signals for better reception by a receiving communication device.

FIG. 8 illustrates a method for a transmitting gateway to tailor its transmitted information-bearing signals for better reception by a receiving communication device. The gateway transmits a first signal having a first polarization 802. This may be a pilot signal that has been processed using a first Walsh code and having RHC (or vertical) polarization. The gateway also transmits a second signal orthogonal to the first signal and having a second polarization different from the first polarization 804. This second signal may also be a pilot signal that has been processed using a second Walsh code and having LHC (or horizontal) polarization. The gateway then receives a signal indicating the relative or absolute signal strengths of the first and second signals as received by a first entity (e.g., wireless communication device) 806. The polarization and/or relative signal strengths of the first and second signals may be identified by their corresponding Walsh codes.

The gateway may be configured to simply transmit to the receiving first entity using the polarization having the strongest received signal strength 808. For example, if the RHC polarization was determined to have greater signal strength, then the gateway transmits using RHC polarization.

According to another aspect, additional information may be received that enables the gateway to better tailor its signals to a particular receiver's polarization. The gateway may receive information indicating the relative signal phase of the first and second signals as received by the first entity 810. The gateway then transmits a proportional amount of signal power on each polarization and uses the proper phasing to match the polarization orientation of the receiving first entity 812.

While various features of the present invention have been illustrated with reference to pilot signals, as used in CDMA2000 communication systems, the present invention may be implemented on other communication systems as well. For example, the polarization optimization schemes described herein may be implemented on a CDMA2000 EV-DO communication system. Since signals in CDMA2000 EV-DO are time-divided, to obtain the two orthogonal pilot signals, pilots can be sent in alternate time slots. Thus, a first pilot signal having a first polarization can be sent on a first time slot and a second pilot signal having a second polarization can be sent on a second time slot. Thus, orthogonality of the pilot signals is achieved by the time slots not Walsh codes. From here, the process described above can be followed to either transmit on the strongest of the two polarizations or proportionally polarize transmitted information-bearing signals to approximately match the polarization of the receiving device.

It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A communication device comprising
   an antenna;
   a transceiver coupled to the antenna, the transceiver employed to manage signal transmissions to and from the antenna; and a processing unit communicatively coupled to the transceiver and configured to
receive a first signal having a first polarization,
receive a second signal having a second polarization different from the first polarization, and
transmit signal strength information associated with the first and second signals and a phase angle between the first and second signals to a gateway to facilitate transmission of content-bearing signals to the communication device by the gateway, wherein each of the content-bearing signals comprising a first transmission signal and a second transmission signal having respective amounts of signal power that are determined proportionally based at least in part on the signal strength information and having a phasing between the first transmission signal and the second transmission signal based at least in part on the phase angle, to substantially match a polarization orientation of the antenna.

2. The communication device of claim 1 wherein the polarization of the antenna varies depending on the orientation of the communication device and operating conditions.

3. The communication device of claim 1 wherein the first polarization is right hand circular polarization and the second polarization is left hand circular polarization.

4. The communication device of claim 1 wherein the first polarization is vertical polarization and the second polarization is horizontal polarization.

5. The communication device of claim 1 wherein the first and second signals are a pilot signal having different polarizations and coding functions.

6. The communication device of claim 1 wherein the first signal is encoded with a first coding function, the second signal is encoded with a second coding function, the first and second coding functions being orthogonal functions.

7. The communication device of claim 6 wherein the first and second coding functions are Walsh functions.

8. The communication device of claim 1 wherein the first signal is received in a first timeslot and the second signal is received on a second time slot to achieve orthogonality between the first and second signals.

9. The communication device of claim 1 wherein the processing unit is further configured to
determine the relative signal strengths of the first and second signals.

10. The communication device of claim 1 wherein the processing unit is further configured to
determine the phase angle between the first and second signals.

11. The communication device of claim 1 wherein the communication device is a mobile telephone that communicates with the gateway through a relaying satellite.

12. The communication device of claim 1 wherein the gateway is a terrestrial base station.

13. A wireless communication device comprising:
means for receiving a first signal having a first polarization;
means for receiving a second signal having a second polarization different from the first polarization; and
means for transmitting signal strength information relating to the first and second signals to a gateway to facilitate transmission of content-bearing signals to the wireless communication device, wherein each of the content-bearing signals comprising a first transmission signal and a second transmission signal having respective amounts of signal power that are determined proportionally as a function of the signal strength information and having a specified phasing between the first transmission signal and the second transmission signal wherein the phasing is determined as a function of a phase angle between the first and second signals, to substantially match a polarization orientation of an antenna of the wireless communication device.

14. The wireless communication device of claim 13 further comprising
means for determining the relative signal strengths of the first and second signals;
means for determining the phase angle between the first and second signals; and
means for transmitting the phase angle to the gateway.

15. A gateway comprising:
an antenna to communicate with one or more communication devices; and
a processing unit communicatively coupled to the antenna, the processing unit to transmit through the antenna and configured to
transmit a first signal having a first polarization;
transmit a second signal having a second polarization different from the first polarization;
receive information indicating respective signal strengths of the first and second signals, and a signal phase between the first signal and the second signal, as received by a first communication device; and
transmit information-bearing signals, to the first communication device, using a first amount of signal power on the first polarization and a second amount of signal power on the second polarization wherein the first amount of signal power and the second amount of signal power are determined proportionally based at least in part on the respective signal strengths of the first signal and the second signal, and using a specified signal phasing determined based at least in part on the signal phase between the first signal and the second signal, to substantially match a polarization orientation of a first antenna of the first communication device.

16. The gateway of claim 15 wherein the processing unit is further configured to
select the polarization having the strongest received signal strength to transmit information-bearing signals.

17. The gateway of claim 15 wherein the first polarization is right hand circular polarization and the second polarization is left hand circular polarization.

18. The gateway of claim 15 wherein the first polarization is vertical polarization and the second polarization is horizontal polarization.

19. The gateway of claim 15 wherein the first and second signals are a pilot signal having different polarizations and coding functions.

20. The gateway of claim 15 wherein the processing unit is further configured to
generate the first signal by encoding a pilot signal with a first coding function, and
generate the second signal by encoding the pilot signal with a second coding function, the first and second coding functions being orthogonal functions.

21. The gateway of claim 20 wherein the first and second coding functions are Walsh functions.

22. The gateway of claim 15 wherein the first and second signals are transmitted on alternate timeslots of a time-divided channel to achieve orthogonality between the first and second signals.

23. The gateway of claim 15 wherein the first and second signals are transmitted on different frequencies to achieve orthogonality between the first and second signals.

24. The gateway of claim 15 wherein the processing unit is further configured to
adjust an amplitude between the first polarization and the second polarization to adjust the signal phase between the first signal and the second signal to substantially match the polarization orientation of the first antenna.

25. The gateway of claim 15 wherein the information received indicating the respective signal strengths of the first and second signals indicates the relative signal strengths of the first and second signals.

26. The gateway of claim 15 wherein the information received indicating the respective signal strengths of the first and second signals indicates the absolute signal strengths of the first and second signals.

27. The gateway of claim 15 wherein the gateway communicates indirectly with the one or more communication devices through a relaying satellite.

28. The gateway of claim 15 wherein the gateway communicates directly with the one or more communication devices.

29. The gateway of claim 15 wherein the gateway is a terrestrial base station.

30. A gateway comprising:
means for transmitting a first signal having a first polarization;
means for transmitting a second signal having a second polarization different from the first polarization;
means for receiving a signal indicating respective signal strengths of the first and second signals, and a phase angle between the first and second signals, as received by a first communication device; and
means for transmitting content-bearing signals, to the first communication device, using a first amount of signal power on the first polarization and a second amount of signal power on the second polarization wherein the first amount of signal power and the second amount of signal power are determined proportionally based at least in part on the respective signal strengths of the first signal and the second signal, and using a specified phasing based at least in part on the phase angle between the first signal and the second signal, to substantially match a polarization orientation of an antenna of the first communication device.

31. The gateway of claim 30 further comprising:
means for generating the first signal by encoding a pilot signals with a first coding function; and
means for generating the second signal by encoding the pilot signal with a second coding function, the first and second coding functions being orthogonal functions.

32. A method operational on a communication device, comprising:
receiving a first pilot signal having a first polarization;
receiving a second pilot signal having a second polarization different from the first polarization;
determining the signal strengths of the first and second signals; and
transmitting signal strength information relating to the determined signal strengths to a gateway to facilitate generating and transmitting information-bearing signals to the communication device, wherein each of the content-bearing signals comprising a first transmission signal and a second transmission signal having respective amounts of signal power that are determined proportionally based at least in part on the signal strength information and having a specified phase angle between the first transmission signal and second transmission signal, wherein the specified phase angle is determined based at least in part on a received phase difference between the first and second signals, to substantially match a polarization orientation of an antenna of the communication device.

33. The method of claim 32 further comprising:
determining the phase difference between the first and second signals; and
transmitting the phase difference to the gateway.

34. The method of claim 32 wherein the transmitted signal strength information is an indicator of the relative signal strengths of the first and second signals as received by the communication device.

35. A method operational on a gateway, comprising:
transmitting a first pilot signal having a first polarization and encoded with a first coding function;
transmitting a second pilot signal having a second polarization different from the first polarization and encoded with a second coding function, the first and second coding functions being orthogonal functions;
receiving information indicating respective signal strengths of the first pilot signal and the second pilot signal, and a phase angle between the first pilot signal and the second pilot signal, as received by a first communication device; and
transmitting content-bearing signals, to the first communication device, using a first amount of signal power on the first polarization and a second amount of signal power on the second polarization wherein the first amount of signal power and the second amount of signal power are determined proportionally as a function of the respective signal strengths of the first pilot signal and the second pilot signal, and using a specified phasing determined as a function of the received phase angle, to match or substantially match a polarization orientation of an antenna of the first communication device.

36. The method of claim 35 further comprising:
selecting the polarization having the strongest received signal strength to transmit content-bearing signals to the first communication device.

37. The method of claim 35 further comprising:
encoding a pilot signal with a first coding function to generate the first pilot signal; and
encoding the pilot signal with a second coding function to generate the second pilot signal, the first and second coding functions being orthogonal functions.

38. The method of claim 35 further comprising:
adjusting an amplitude between the first polarization and the second polarization to facilitate adjusting the specified phasing between the first signal and the second signal to match or substantially match the polarization orientation of the antenna.

39. The method of claim 35 wherein the gateway transmits its signals to the first communication device through a relaying satellite.

40. A machine-readable medium having one or more instructions for a communication device to notify a gateway of its polarization, which when executed by a processor causes the processor to:
receive a first pilot signal having a first polarization and encoded with a first coding function;
receive a second pilot signal having a second polarization different from the first polarization and encoded with a second coding function, the first and second coding functions being orthogonal functions; and
transmit signal strength information of the first and second pilot signals to the gateway to facilitate transmission of content-bearing signals to the communication device, wherein each of the content-bearing signals comprising a first transmission signal and a second transmission signal having respective amounts of signal power that are determined proportionally based at least in part on the signal strength information and having a phasing between the first transmission signal and the second transmission signal determined based at least in part on a phase angle between the first and second signals, to substantially match a polarization orientation of an antenna of the communication device.

41. The machine-readable medium of claim 40 further comprising:
   determine the phase angle between the first and second signals; and
   transmit the phase angle to the gateway.

42. A machine-readable medium having one or more instructions for a gateway to determine a polarization of a first communication device, which when executed by a processor causes the processor to:
   transmit a first pilot signal having a first polarization and encoded with a first coding function;
   transmit a second pilot signal having a second polarization different from the first polarization and encoded with a second coding function, the first and second coding functions being orthogonal functions;
   receive a signal indicating respective signal strengths relating to the first and second pilot signals as received by the first communication device; and
   transmit content-bearing signals, to the first communication device, using a first amount of signal power on the first polarization and a second amount of signal power on the second polarization wherein the first amount of signal power and the second amount of signal power are determined proportionally based at least in part on the respective signal strengths of the first pilot signal and the second pilot signal, and using a specified phase angle determined based at least in part on a received signal phase between the first pilot signal and the second pilot signal, to match or substantially match a polarization orientation of an antenna of the first communication device.

43. The machine-readable medium of claim 42 further comprising:
   select the polarization having the strongest associated pilot signal strength to transmit content-bearing signals to the first communication device.

44. The machine-readable medium of claim 42 further comprising:
   receive information indicating the signal phase of the first and second pilot signals as received by the first communication device.

45. A processing unit comprising:
   a processing circuit configured to
      receive a first signal having a first polarization;
      receive a second signal having a second polarization different from the first polarization;
      determine the relative signal strengths of the first and second signals; and
      transmit the signal strength information relating to the first and second signals and a phase angle between the first and second signals to a gateway to facilitate transmission of information-bearing signals to a communication device, wherein each of the information-bearing signals comprising a first transmission signal and a second transmission signal having respective amounts of signal power that are proportionally determined as a function of the signal strength information and having a specified phase angle determined as a function of the received phase angle, to substantially match a polarization orientation of an antenna of the communication device.

46. A processing unit comprising:
   a processing circuit configured to
      transmit a first signal having a first polarization;
      transmit a second signal having a second polarization different from the first polarization;
      receive a signal indicating the respective signal strengths of the first and second signals and a phase angle between the first and second signals as received by a first communication device; and
      transmit content-bearing signals, to the first communication device, using a first amount of signal power on the first polarization and a second amount of signal power on the second polarization wherein the first amount of signal power and the second amount of signal power are proportionally determined based at least in part on the respective signal strengths of the first signal and second signals, and using a specified phase angle determined based at least in part on the received phase angle, to match or substantially match a polarization orientation of an antenna of the first communication device.

* * * * *